United States Patent [19]

Taylor et al.

[11] Patent Number: 5,307,477
[45] Date of Patent: Apr. 26, 1994

[54] TWO-LEVEL CACHE MEMORY SYSTEM

[75] Inventors: George S. Taylor, Menlo Park; P. Michael Farmwald, Berkeley; Timothy P. Layman, San Carlos; Huy X. Ngo, Santa Clara; Allen W. Roberts, Union City, all of Calif.

[73] Assignee: Mips Computer Systems, Inc., Sunnyvale, Calif.

[21] Appl. No.: 59,715

[22] Filed: May 10, 1993

Related U.S. Application Data

[63] Continuation of Ser. No. 444,660, Dec. 1, 1989, abandoned.

[51] Int. Cl.$^5$ ............................................. G06F 12/08
[52] U.S. Cl. ................................... 395/425; 395/400; 364/DIG. 1; 364/243.45; 364/243.41
[58] Field of Search ............................... 395/400, 425

[56]  References Cited

U.S. PATENT DOCUMENTS

| | | | |
|---|---|---|---|
| 4,442,487 | 4/1984 | Fletcher | 395/425 |
| 4,464,712 | 8/1984 | Fletcher | 395/425 |
| 4,612,612 | 9/1986 | Woffinden et al. | 395/425 |
| 4,701,844 | 10/1987 | Thompson et al. | 395/425 |
| 4,707,784 | 11/1987 | Ryan et al. | 395/425 |
| 4,713,755 | 12/1987 | Worley, Jr. et al. | 395/375 |
| 4,736,293 | 4/1988 | Patrick | 395/425 |
| 4,755,930 | 7/1988 | Wilson, Jr. et al. | 395/425 |
| 4,774,654 | 9/1988 | Pomerene et al. | 395/425 |
| 4,785,395 | 11/1988 | Keeley | 395/425 |
| 4,797,814 | 1/1989 | Brenga | 395/425 |
| 4,807,110 | 2/1989 | Pomerene et al. | 395/425 |
| 4,823,259 | 4/1989 | Aichelmann, Jr. | 395/425 |
| 4,831,622 | 5/1989 | Porter et al. | 371/10 |
| 4,926,317 | 5/1990 | Wallach et al. | 395/400 |
| 4,980,823 | 12/1990 | Liu | 395/425 |
| 4,985,829 | 1/1991 | Thatte et al. | 395/425 |
| 4,991,081 | 2/1991 | Bosshart | 395/425 |
| 5,018,061 | 5/1991 | Kishigami et al. | 395/400 |
| 5,023,776 | 6/1991 | Gregor | 395/425 |
| 5,058,006 | 10/1991 | Durdan et al. | 395/425 |
| 5,095,424 | 3/1992 | Woffinden et al. | 395/425 |

OTHER PUBLICATIONS

Baskett et al., "The 4D-MP Graphics Superworkstation"; 33rd IEEE Computer Society International Conference; Spring 1988, pp. 468-471.

Stone; "High-Performance Computer Architecture: Cache memory"; Addition-Wesley; pp. 29-69; 1987.

Taylor et al; "An ECL RISC microprocessor designed for two level cache"; 35th IEEE Computer Society International Conference; Spring 1990, pp. 228-231.

Primary Examiner—Parshotam S. Lall
Assistant Examiner—Krisna Lim
Attorney, Agent, or Firm—Townsend and Townsend Khourie and Crew

[57]  ABSTRACT

A two-level cache memory system for use in a computer system including two primary cache memories, one for storing instructions and one for storing data. The system also includes a secondary cache memory for storing both instructions and data. The primary and secondary caches each employ their own separate tag directory. The primary caches use a virtual addressing scheme employing both virtual tags and virtual addresses. The secondary cache employs a hybrid addressing scheme which uses virtual tags and partial physical addresses. The primary and secondary caches operate in parallel unless the larger and slower secondary cache is busy performing a previous operation. Only if a "miss" is encountered in both the primary and secondary caches does the system processor access the main memory.

5 Claims, 9 Drawing Sheets

| 31 | | 10 | 3 | 2 | 1 | 0 |
|---|---|---|---|---|---|---|
| PAGE PHYSICAL NUMBER | | – | N | W | V | G |
| 22 | | 6 | 1 | 1 | 1 | 1 |

*FIG. 2a.*

| 31 | | 10 | 3 | 2 | 1 | 0 |
|---|---|---|---|---|---|---|
| PHYSICAL PAGE NUMBER | | | N | | V | G |
| 22 | | 6 | 1 | 1 | 1 | 1 |

*FIG. 2b.*

| S-CACHE PARTITION ||||
|---|---|---|---|
| ADDRESS (HEX) | SIZES | BANK 0 | BANK 1 |
| 00000 – 3BFFF | 60K WORDS | DATA OR INSTRUCTIONS | DATA OR INSTRUCTIONS |
| 3C000 – 3DFFF | 2K WORDS (RESERVED) | TLBs | TLBs |
| 3E000 – 3FFFF | 2K WORDS (RESERVED) | PHYSICAL TAGs | PHYSICAL TAGs |

*FIG. 3a.*

| | BANK 0 | BANK 1 |
|---|---|---|
| WORD 0 | SET 0 | SET 1 |
| WORD 1 | SET 1 | SET 0 |
| WORD 2 | SET 0 | SET 1 |
| WORD 3 | SET 1 | SET 0 |
| ... | ... | ... |

*FIG. 3b.*

| OPERAND ADDRESS FOR SCACHE INSTRUCTION |||||| 
|---|---|---|---|---|---|
| VPN<31..25> | 0000000 | 1111 | TLB/TAG | VPN<24..14> | XX |

FIG. 10.

| CYCLE | (1) | (2) | (3) | (4) | (5) | (6) | (7) |
|---|---|---|---|---|---|---|---|
| CPU | (I) | (A) | (D) | (N) | (W) | | |
| CACHE | | | (P) | (PR) | (SR) | | |
| | I-FETCH | AD-GEN | DATA CACHE | NULL | NULL | | |
| | | | READ I-CACHE | ..... | WRITE Wd.0 | WRITE Wd.1 | WRITE Wd.2 |
| | | | READ PTAG | IC-MISS... | WRITE PTAG | | |
| | | | READ STAG0 | READ STAG1 | SC-HIT... | | |
| | | | READ S-CACHE || TRANSFER Wd.0 | | |
| | | | | READ S-CACHE || TRANSFER Wd.1 | |
| | | | | | READ S-CACHE || TRANSFER Wd.2 |
| | | | | | | READ S-CACHE ||

FIG. 12.

| CYCLE # | (1) | (2) | (3) | (4) | (5) | (6) |
|---|---|---|---|---|---|---|
| CPU | (I) | (A) | (D) | (N) | (N) | (W) |
| CACHE | | | (P) | (PR) | (SR) | |

| I-FETCH | AD-GEN | DATA CACHE | CPU STALLED | ALIGN | WR RF |
|---|---|---|---|---|---|
| | | READ D-CACHE | ... | WRITE Wd.A | WRITE Wd.B |
| | | READ PTAG | DC-MISS... | WRITE PTAG | |
| | | READ STAG0 | READ STAG1 | SC-HIT... | |
| | | READ S-CACHE | | TRANSFER Wd.A | |
| | | | READ S-CACHE | | TRANSFER Wd.B |

*FIG. 13.*

| CYCLE | (1) | (2) | (3) | (4) | (5) | (6) | (7) |
|---|---|---|---|---|---|---|---|
| CPU | (I) | (A) | (D) | (N) | (W) | | |
| CACHE | | | (P) | (PR) | (SR) | | |

| I-FETCH | AD-GEN | DATA CACHE | NULL | NULL | | |
|---|---|---|---|---|---|---|
| | | WRITE D-CACHE | ... | NO WRITE | ... | WRITE Wd.B |
| | | READ PTAG | DC-MISS... | WRITE PTAG | | |
| | | READ STAG0 | READ STAG1 | SC-HIT... | | |
| | | | | READ S-CACHE | | TRANSFER Wd.B |
| | | | | WRITE S-CACHE | | |
| | | | | | WRITE DIRTY | |
| | | | | | WRITE LRU | |

*FIG. 14.*

| CPU PIPELINE | A LOAD | D | N | N | N | N | W |
|---|---|---|---|---|---|---|---|
| CACHE PIPELINE | | P LOAD | PR | P | PR | SR | |
| | | | DC-MISS | | DC-MISS | DCFILL | |
| | | | RETRY | ACCESS S-CACHE | | | |

FIG. 15.

| CPU PIPELINE | A1 LOAD | D1 | N1 | N1 | W1 | | |
|---|---|---|---|---|---|---|---|
| | I2 BRANCH | A2 | D2 | D2 | N2 | W2 | W2 |
| | | I3 ALU | A3 | A3 | D3 | N3 | N3 |
| CACHE PIPELINE | | P1 LOAD | PR1 | SR1 | | | |
| | | | DC-MISS | DCFILL | | | |
| | | | P2 TFETCH | PR2 | P2 | PR2 | SR2 |
| | | | | IC-MISS | | | ICFILL |
| | | | | RESTART | ACCESS S-CACHE | | |

FIG. 16.

TWO-LEVEL CACHE MEMORY SYSTEM

This is a continuation of application Ser. No. 07/444,660, filed Dec. 1, 1990, now abandoned.

BACKGROUND OF THE INVENTION

1. Field of the Invention

This invention relates to computer systems, and in particular, to a two-level cache memory system having separate primary instruction and data caches and a single secondary cache containing both instructions and data.

2. Description of the Prior Art

In computer systems it is desirable to obtain information for use by the central processor as rapidly as the central processor can execute its instructions. Typically, however, the central processing unit is capable of executing instructions much faster than those instructions and the necessary data may be retrieved from the main memory. As a result, cache memories have been developed for storing frequently used information.

Most current computer systems use virtual memory to provide protection, large address spaces and convenient allocation of physical memory. In virtual memory systems, addresses must be translated at some point between the processor and main memory. While most aspects of cache design are unrelated to virtual memory, whether translation occurs before or after the cache access is a crucial issue and one which is quite visible to the memory management software. If fast cache access were the only consideration, then a virtual cache would be attractive because it could be accessed without waiting for the translation. There are, however, several reasons why physical cache systems are simpler to build. Two of the most important are virtual address synonyms and the desire to build cache coherent multiprocessors. Certain architectures have eliminated the synonym problem by definition, but a constraint in many architectures is that synonyms are allowed both within a single address space and between multiple address spaces.

Virtual memory is usually implemented by page tables which translate every virtual page number into the appropriate physical page number. Because the page tables are large and because the format of a page table entry should not be tied to a particular hardware from the page tables into a translation-lookaside buffer (TLB) that is referenced by the hardware In most respects, the TLB is just a special cache for the page tables A cache memory may contain instructions, data, or both, but the cache does not occupy a fixed set of addresses in the memory address space. Instead, the cache contains a duplicate of what is stored at a selected set of the main memory addresses. The entries in caches are termed lines, and each line contains an information field (instruction or data) and a tag field. A line can contain an arbitrary number of words. In operation, when the processor requires an access to memory, it checks the tag fields in the cache to determine if the requested address is present there. If the address is present in the cache (termed a hit), the access is performed on the cache, rather than on the main memory. Because of the higher speed of the cache, the processor does not need to wait for the information to be retrieved from the main memory and may proceed on with executing its instruction stream. On the other hand, if the information sought is not present in the cache (a miss), then the information must be retrieved from main memory. lookaside buffer (TLB) has translated a virtual address into a physical address. A portion of this physical address is used as an index to point to a physical address tag and the corresponding data. Computing systems employing this approach include the IBM 3090 series, the DEC VAX 11/780, and the MIPS RC3260. Unfortunately, such a physical index, physical tag cache in undesirably slow and the TLB undesirably large.

Another well known cache system is a virtual cache in which virtual indexes and virtual tags are employed. Sun Microsystems' 3/200 computer systems employ such a cache. Such caches, however, have difficulty dealing with circumstances in which the virtual addresses for two separate programs map to a single physical address. These two virtual addresses must be managed by the system to prevent their simultaneous presence in the cache.

A third well known cache system employs a virtual index and a physical tag. Such systems include the ELXSI 6400 system. In these systems the TLB operates in parallel with the data access to generate the physical address for comparison to the tag to determine if there is a hit. A significant disadvantage of these cache architectures is the space required for the TLB. Because a TLB read is required for every access, a large TLB is necessary. This makes incorporation of such a system on a single chip difficult.

A few two level cache architectures have been developed. One such system is the Silicon Graphics 4D-MP workstation is described in "The 4D-MP Graphics Superworkstation: Computing+Graphics=40 MIPS+40 MFLOPS and 100,000 Lighted Polygons per Second," by Forest Baskett, Tom Jermoluk and Doug Solomon, 33rd IEEE Computer Society International Conference (Spring, 1988) IEEE Catalog No. 88CH2539-5, pp. 468-471. The system described there incorporates a MIPS R2000 CPU and R2010 FPU with a single instruction cache and a first and second data cache separated by a write buffer. The instruction cache is fed by a read buffer, while the data caches drive a write buffer. The first level data cache is always a subset of the second level data cache to maintain consistent data. In addition, all of the caches—both instruction and data—employ only physical addresses.

A direct-mapped cache is a cache in which a word from the main memory can be stored at only one place in the cache. Typically, for a physically indexed cache, the cache is indexed by the low order bits of the main memory address. In such caches the tag field of the selected line stores the high order bits of the address. Thus, when access to a particular main memory address is requested, the cache hardware employs the low order bits as an index to select the corresponding line in the cache, and then compares the tag for that line with the remaining address bits. If a hit occurs, it accesses the selected byte in the line. If a miss occurs, the requested address is not in the cache and the selected line is replaced with new information from the main memory.

A cache is termed set-associative when a line from memory can be placed in more than one place in the cache; in other words, when the cache provides different frames where memory addresses with identical low order address bits may be placed. For example, a two-way set-associative cache allows two memory addresses with identical low order bits to be stored in the cache at the same time. In such a circumstance, when access to a particular main memory address is requested, the cache hardware uses the low order address bits to select the set of lines in the cache. The cache then compares all of the tags in the set (in this case two) with the high order address bits, and if a hit occurs, it accesses the selected byte in the corresponding information field. If a miss occurs, the requested address is not in the cache and one of the lines in the cache must be replaced, typically using a least recently used (LRU) based algorithm.

Cache memories must also employ a write policy to maintain consistent information in the cache and main memory. A write-back cache is one in which at the time information is written into the cache, the cache bytes are marked as being modified. Before replacing a line in the cache which contains modified bytes, the cache must write the modified bytes back to the main memory. In a write-through cache, when information in the cache is modified, it is immediately also written into the main memory.

SUMMARY OF THE INVENTION

The cache system of our invention is suitable for use with processors having extremely fast clock speeds. When such systems employ commodity dynamic RAMs, it is necessary to overcome the large ratio of memory access time to processor cycle time. We achieve this by providing a two-level cache structure in which the first level is fast and the second level large. In our system two primary caches are provided—one for instructions and one for data. A single secondary cache holds both instructions and data. The primary caches are direct mapped and the secondary cache is two-way set-associative. The primary cache is write-through while the secondary cache is write-back.

We have developed a cache system and associated TLB mechanism which has numerous advantages over prior art cache systems. In our cache system, the cache access sequence does not require a physical cache tag or reference to a full width TLB in the cases of either primary or secondary cache hits. The two-level cache structure of our invention provides a primary cache with minimum read access time and write cycle time. By employing a virtual address in the primary cache, the need for address translation is eliminated. The write-through policy in the primary data cache eliminates the need to detect hits before writing into the cache.

The secondary cache is a two-way set-associative cache to maximize the hit rate, while a write-back policy is employed to reduce the overhead for updating main memory. By employing virtual tags in the secondary cache, full address translation is unnecessary on cache hits.

The amount of RAM required for the caches is reduced by employing a single bank of RAM for the two primary cache tags and a single bank of RAM for the secondary cache tag. To save additional RAM, a first portion of the secondary cache is reserved for holding physical tags, and a second portion is reserved for holding TLB entries.

The cache structure of our invention is also advantageous in that a mechanism is provided for starting a secondary cache reference at the same time as a primary cache reference whenever the secondary cache is not busy completing a previous transaction. We implement partial word stores by invalidation in the primary data cache and by writing selected bytes in the secondary cache. This also reduces the amount of RAM required in the primary data cache. Another feature of our invention is the addition of an extra bit per word in the secondary cache so that only words which are actually modified are written into the main memory, rather than entire lines.

BRIEF DESCRIPTION OF THE DRAWINGS

FIGS. 2a and 2b are diagrams illustrating the page table entry format and TLB entry format.

FIG. 3a is a diagram illustrating the partitioning of the secondary cache.

FIG. 3b is a diagram illustrating the storage of lines in the secondary cache in alternate banks of memory.

FIG. 10 illustrates the structure of the operand address for SCACHE instructions.

FIG. 12 is a timing model for the primary instruction cache linefill operation.

FIG. 13 is a timing model for the primary data cache linefill operation.

FIG. 14 is a timing model for the store word instruction, with a primary cache miss, but a secondary cache hit.

FIG. 15 is a diagram of the timing model for a retry instruction.

FIG. 16 is a diagram of the timing model illustrating a restart operation.

DETAILED DESCRIPTION OF THE PREFERRED EMBODIMENT

The Primary and Secondary Caches—Overview

This invention provides a cache memory system for use in a general purpose computer. In the preferred embodiment the cache is incorporated into a computing system which employs a faster clock rate than most general purpose processors, but uses the same commodity dynamic RAMs in its main memory as other processors. To overcome the large ratio of memory access time to processor cycle time, a two-level cache is used. The first or primary cache is fast, while the second or secondary cache is large.

Preferably, the system has two primary caches (one for instructions and one for data) and a single secondary cache that holds both instructions and data. The primary caches are direct mapped and the secondary cache is two-way set associative. The primary data cache is write-through, while the secondary cache is write-back. In the primary caches both the index and tag are virtual. In the secondary cache a physical index is employed. In this system, the virtual address will be fully translated only if a normal instruction or data reference causes a secondary miss.

Figure 1:
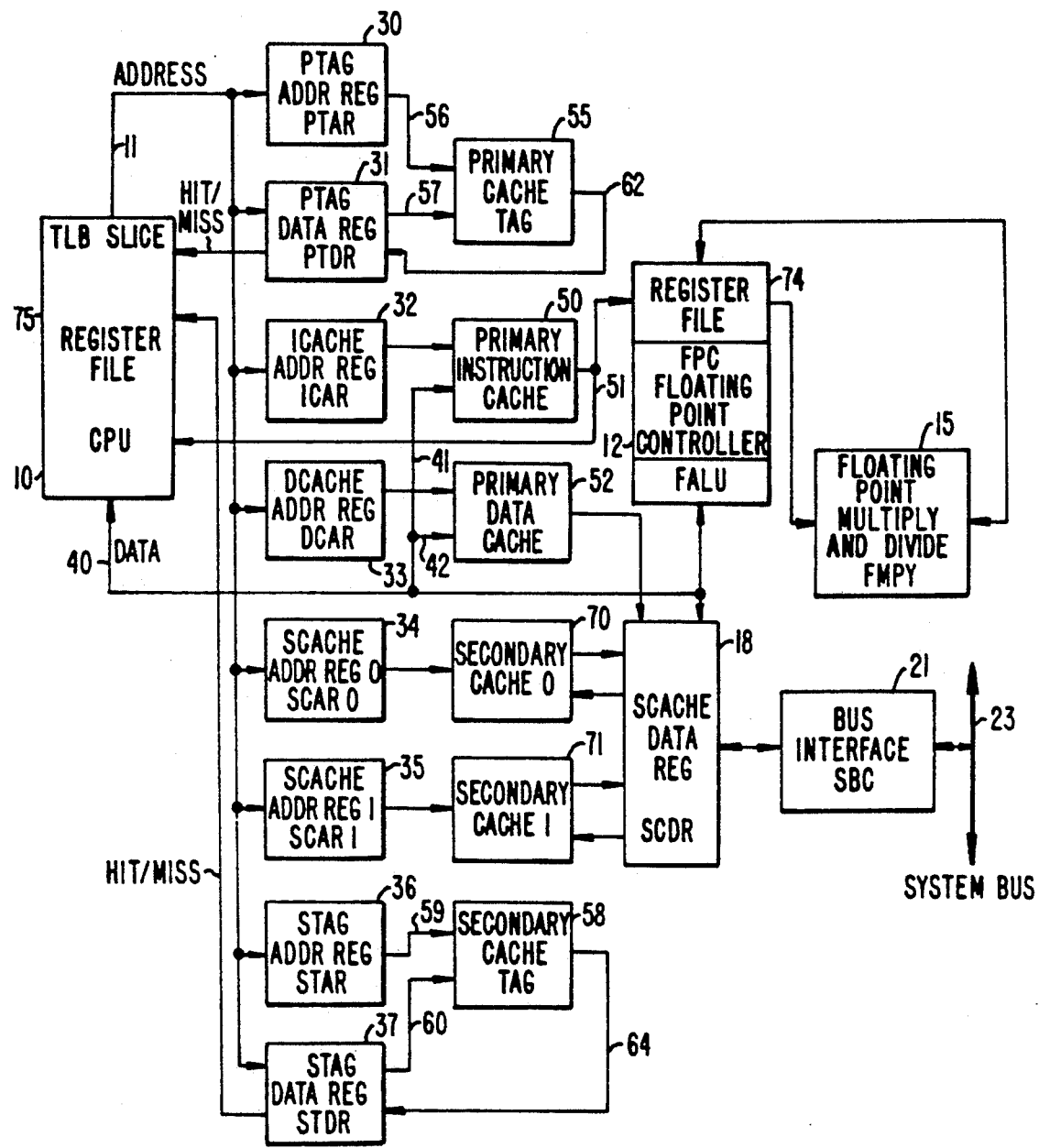
FIG. 1 is a block diagram of an overall computing system employing a preferred embodiment of the cache system.

FIG. 1 is a block diagram of a computer system implementing the cache architecture of a preferred embodiment of this invention. In FIG. 1 instruction processing is handled by the central processing unit (CPU) 10 and floating-point controller (FPC) 12, each typically being formed on a separate integrated circuit, although this is not necessary. CPU 10 holds the integer register file, while FPC 12 holds the floating-point register file. The floating-point multiply, divide and square root execution units are in a separate FMPY chip 15 connected to the FPC 12. Of course, the FMPY functions could be integrated onto other chips. The CPU 10 communicates with the primary caches 50, 52 over address bus 11, data bus 40, and instruction bus 51.

The address bus 11 connects CPU 10 to all of the cache address and data registers 30-37. The data bus 40 is a bidirectional bus that connects the CPU 10, the FPC 12, the primary caches 50, 52 through their input buses 41, 42 and the secondary cache data register (SCDR) 18. The CPU 10 and the FPC 12 send data to and receive it from the secondary cache over bus 40 through the secondary cache data register 18. The SCDR 18 is also connected to a system bus interface circuit (SBC) 21, which provides an interface to the system bus 23. Instructions go from the primary instruction cache (i-cache) 50 to the CPU 10 and FPC 12 on an independent bus 51 to reduce conflicts and latency. The primary data cache 52 is connected directly to the SCDR 18 rather than to the CPU and FPC.

The primary 55 and secondary 58 cache tags are stored in two banks of RAM. The address lines 56, 59 of each bank are driven by a primary tag address register (PTAR) 30 and a secondary tag address register (STAR) 36, respectively. Output lines 62, 64 from the primary and secondary cache tag RAM banks connect to a corresponding data registers PTDR 31 or STDR 37. These data registers send cache miss and parity error signals to the CPU 10.

The two primary caches 50,52 share a single tag RAM bank 55 because most instructions are in the same line as the previous instruction and because only 30-40% of all instructions are loads or stores. Thus, the primary instruction cache tag does not need to be checked again if the current instruction is in the same line as the previous one, but the primary data cache tag must be checked on every data cache reference. If the primary instruction cache tag were not checked until the first instruction in each line were fetched, there would be a tag conflict whenever the second previous instruction was a load, a store, or a branch. A conflict would occur on approximately 5% of all instructions (the probability of a load or store in the next to last word of an primary instruction cache line). To reduce the conflict rate, the tag for the next primary instruction cache line is checked during any cycle when the primary tag RAM is idle. The lookahead bit is cleared by any branch or trap. An adder adds the instruction cache line size to the current address to produce the address for pretesting.

One bank of RAM makes up each of the primary instruction cache 50 and primary data cache 52. The primary instruction cache 50 is driven by the instruction cache address register (ICAR) 32. The low order three bits of this register are a modulo-8 counter, which allows fetching instructions within a cache line and refilling instructions after a cache miss without receiving new addresses from the CPU 10. In addition to the modulo-8 counter, the ICAR 32 can also serve as a full counter to fetch instructions across a cache line boundary. The primary data cache 52 is driven by the data cache address register (DCAR) 33. The low order bit of this register toggles to load the second word after a primary data cache miss without receiving a new address from the CPU.

One banks of RAM is also used for each of the secondary caches 70, 71. These banks are driven by secondary cache address registers SCAR0 34 and SCAR1 35. Bits <06-03> of each address register are a modulo-16 counter to allow a 32-word secondary cache line to be read or written without receiving new addresses from the CPU. Data is written to and read from the secondary cache through registers in the SCDR 18.

The hardware does not access the page tables directly. Instead, the translation lookaside buffer (TLB) is maintained by software. Needed entries from the page tables are formatted, then copied into the TLB by software. This allows the page table entry (PTE) format to be independent of the hardware implementation. In the preferred embodiment the PTE format and the TLB entry format are the same.

FIG. 2a shows the structure of the secondary tag, while FIG. 2b illustrates the structure of the primary tag. The principal component of a TLB entry is the physical page number (PPN) corresponding to the virtual page number addressed. The N bit indicates whether the page is noncacheable. The W bit indicates if the page is writable. The V bit indicates whether the TLB entry is valid. Finally, the G bit, if set, causes the process identification (PID) field to be an automatic match during tag compares.

If a normal instruction or data reference causes a virtual tag miss in the secondary cache, termed a secondary miss (SMISS), the cache controller begins by referencing the secondary cache again to read a TLB entry. If the TLB reference causes a cache miss, a software trap occurs. The software copies 32 valid TLB entries into the line. If it copies less than 32, the remainder are marked invalid. The exception handler completes and the user program resumes execution. This software solution relies on TLB misses being rare and that TLB cache lines are rarely replaced.

The secondary cache is accessed with physical addresses. In the preferred embodiment, a 4-bit wide TLB slice is employed on the CPU chip to generate four additional low order physical page number bits. Thus, for a page size of 16K bytes (14-bit physical byte index), the CPU chip provides an 18-bit physical addresses to support a secondary cache as large as 512 kilobytes. (Eighteen bits would support a 256-kilobyte cache; however, the secondary cache is two-way set associative.) Half of the 16-entry TLB-slice array is dedicated for instruction fetches, while the other half is dedicated for operand fetches. The TLB-slice array is indexed using the least-significant bits of the virtual page number (VPN). The entry, pointed to by a particular index, contains 4 bits of the physical page number (PPN) last translated for that particular index.

The 32-bit virtual address space of a single process is divided into four regions, from low to high address termed Kuseg, K0, K1 and K2. References to the K0 segment bypass the TLB slice and address the secondary cache directly with the low order 18 bits of the virtual address. If there is a cache miss, the 36-bit physical address is formed by zero-extending the low order 29 bits of the virtual address. The cache miss handler does not read a TLB entry from the secondary cache in this case, as it does after a cache miss on a reference in the Kuseg (user) segment or K2 (kernel) segment. References to the K1 segment go directly to memory, bypassing the TLB slice and the caches. The TLB slice logic is used for normal operand accesses that are mapped, but never forms an address that points to the "reserved" area. If an address is unmapped (K0 or K1 segments) and all of bits 17 through 14 are ones, then bit 17 is forced to zero. For all mapped addresses which cause a TLB slice miss, after the miss and before refilling, the inspection and modification of the bits 17 through 14 is performed. Therefore, the TLB slice will never contain a 4-bit code pointing to the reserved section of the cache. The TLB slice is described in further detail in copending U.S. patent application Ser. No. 07/444,594, filed Dec. 1, 1989, now U.S. Pat. No. 5,226,133 issued on Jul. 6, 1993, and entitled "Translation Look-Aside Buffer Using Partial Addresses for Enhanced Speed."

The Primary Caches

The primary instruction cache 50 is preferably 64K bytes in size, while the primary data cache 52 is preferably 16K bytes in size. The primary data cache is write-through. The write access takes one machine cycle for both caches. The read access time is one cycle for both caches. Both of the primary caches are direct-mapped and word-addressable, although the data cache can easily be byte addressable.

The primary caches use virtual addresses and virtual tags to avoid using the TLB slice mechanism. One advantage of virtual tags is that primary cache hits mask TLB slice misses. The primary tag (PTAG) structure includes 8 bits for the PID, 18 for the virtual address, and one each for the valid, word parity, and global bits. In the preferred embodiment the primary instruction cache line size is eight words. Thus, the tag does not have to be read on most instruction fetches. The primary data cache line size is two words to simplify the implementation of the store double-word instruction. The 16K bytes provide 2048 lines in the data cache, while 64K bytes provide 2048 lines in the instruction cache.

The Secondary Cache

The secondary cache is at the second level of the two-level cache structure. Its organization is shown in FIG. 3a. Preferably, it is 512K bytes in size, organized into two 64K-word banks. In such an embodiment, the bottom 480K bytes are used to hold mixed instructions and data. The top 32K bytes are reserved to hold TLB entries and physical tags.

Figure 4:
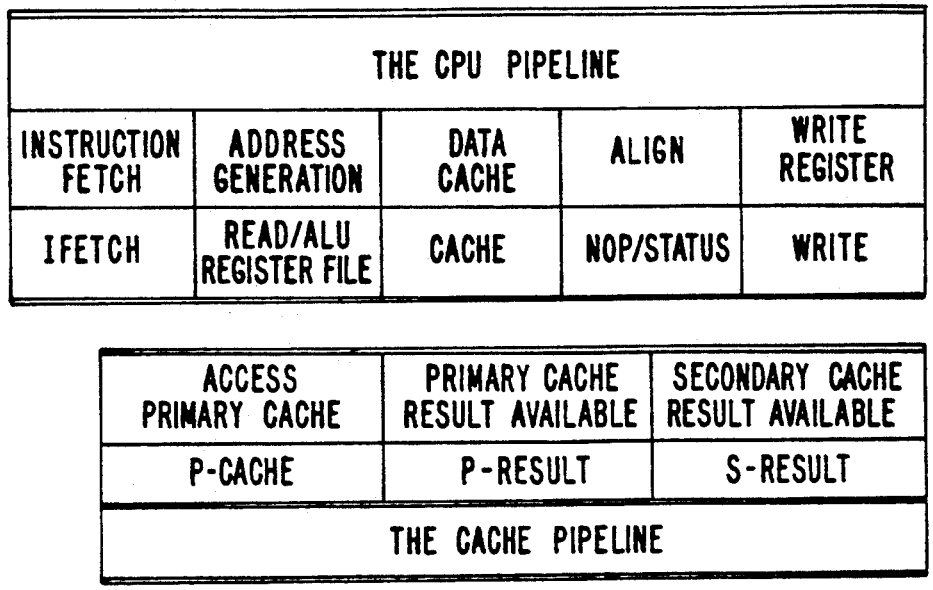
FIG. 4 is a diagram of the cache pipeline and its relationship to the CPU pipeline.

The secondary cache is write-back. As shown in FIG. 4, the secondary cache lines are stored in two banks of RAM; thus, block operations ping-pong to alternate sides to move one word per cycle. The write or read time for either bank is two cycles. For store operations, both the primary data cache and the secondary cache are accessed in parallel. For other operations, the secondary cache may be accessed in parallel with one of the instruction or data primary caches, depending on whether the secondary cache is already busy. If only the primary cache is accessed and a primary cache miss occurs, the failing operation is reissued to both levels of the cache system when allowed. In the best case, a secondary cache access can be initiated every two cycles by the CPU. The only time the secondary cache will see back-to-back requests is when a high-priority access is issued, canceling the unfinished access issued the cycle before.

To lower the miss rate, the secondary cache is two-way set associative, although a greater degree of associativity also may be employed. The replacement algorithm employed is a modified least recently used (LRU) algorithm. The secondary cache uses physical addresses and virtual tags. Virtual tags are used in the secondary cache for the same reason as in the primary cache—to eliminate the need for a full-width hardware TLB.

Physical addresses are used in the secondary cache because the operating system performs page handling activities using physical addresses. The TLB-slice mechanism is used to provide the four additional physical address bits needed to reference the secondary cache.

The physical page number of the line currently occupying each secondary cache frame, called the physical tag, is kept in the bottom half of the "reserved" area in the secondary cache (TLB entries occupy the top half). The physical tag format uses 22 high order bits 31–10 for the page frame number. A certain physical page number is reserved by software convention to indicate that the corresponding secondary cache line is empty.

In the preferred embodiment, the secondary cache line size is 32 words. This size is chosen so that the secondary tag portion will have 4096 entries (2048 for each set). As shown in FIG. 3b, each line occupies words in alternate banks. For instance, if a line is in logical set 0. its first word will be in bank 0, its second word will be in bank 1, etc. If the line is in logical set 1, its first word would be in bank 1, its second word in bank 0, and so on. This allows a line to be streamed into the banks of RAM with one word going to each bank on alternate cycles. When the cache is referenced for a single word, both banks are read in parallel to supply the appropriate word from each set.

The Cache Pipeline

FIG. 4 shows the CPU and cache pipelines. The cache pipeline consists of three stages. The first stage is called primary (P) since the primary cache is always accessed during this cycle. (The secondary cache may be accessed in parallel.) This stage is driven by the address (A) stage of the CPU pipeline. In the second stage of the cache pipeline, called primary result (PR), the result and the status of the primary cache access are available. The primary cache hit/miss status is sent to the CPU to control its pipeline and to the cache controller to control its state machine in the next cycle. The last stage of the cache pipeline, called secondary result (SR), provides the result and the status of the secondary cache access. The secondary hit/miss status and the primary hit/miss status determine operations for both caches.

Hardware Organization

The cache system can be viewed as consisting of two major blocks. The control block, called the cache controller, consists of the TLB-slice hardware, the cache pipeline, the state machine, and support logic. The data path block is made up of RAM arrays and peripheral registers.

Figure 5:
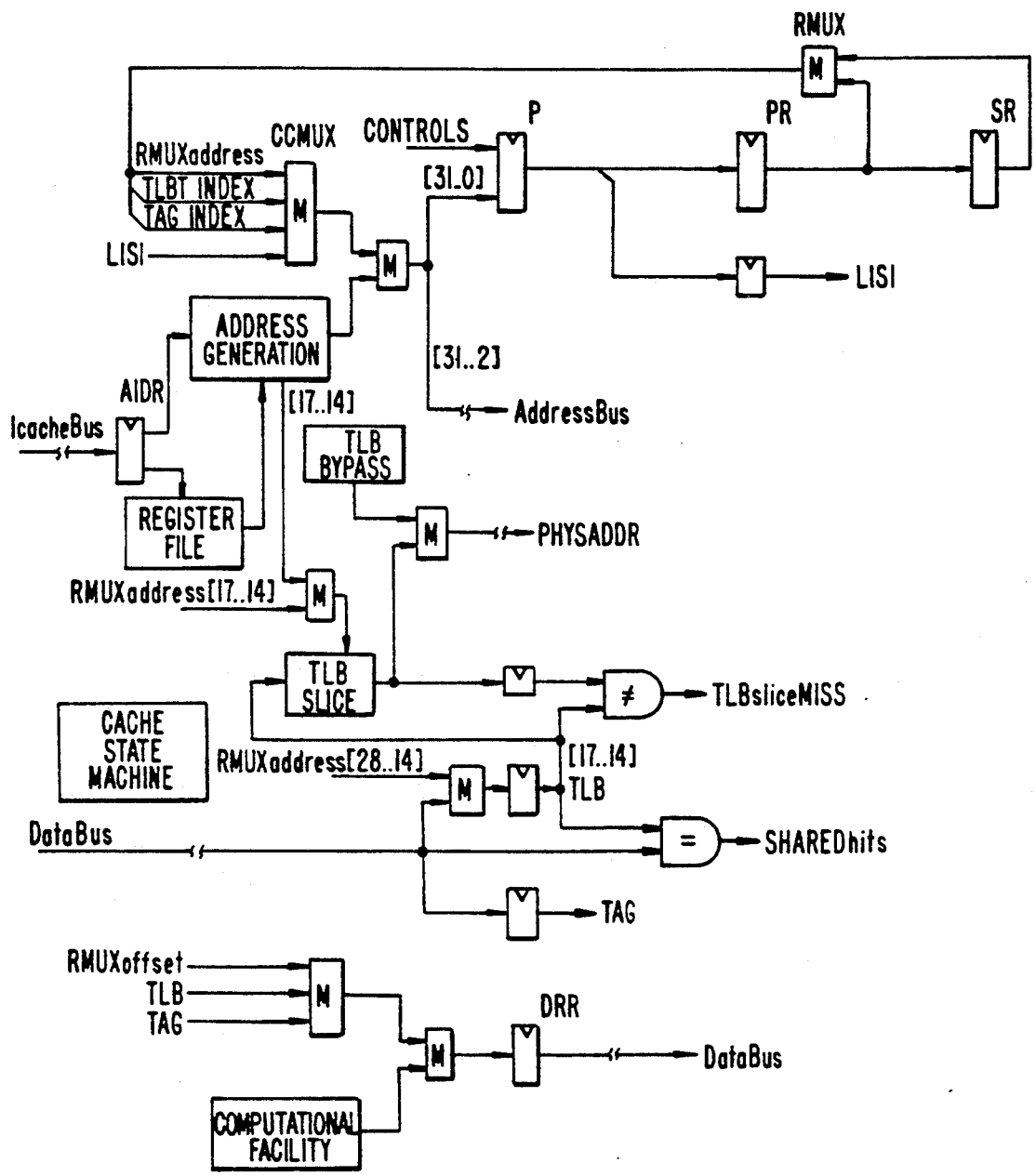
FIG. 5 is a block diagram of the cache controller.

The cache controller block diagram is shown in FIG. 4. The three-stage cache pipeline (FIG. 5) contains information pertaining to accesses currently being done in the cache system. It is controlled by the cache controller. All three stages in the pipeline have the same format. The fields within the cache pipeline stage include a 32-bit effective address, a 5-bit cache opcode, and a single bit for each of load locked-store conditional, secondary and active conditions. The effective memory address is provided by address generation logic. The load locked-store conditional (LLSC) bit is set for LoadLocked-Store Conditional operations. The secondary bit indicates that the operation accesses the secondary cache in parallel with the primary cache. This is used to determine if the operation must be retried in case of a primary cache miss. Finally, the active bit indicates whether the pipeline stage is active. A failing operation will force any subsequent operations to be inactive so that they will be idled and transparent to the control logic. After the failing operation has been serviced, inactive operations in the cache pipeline will be restarted.

Register

For every primary cache operation, the primary tag address register (PTAR) 30 (see FIG. 1) is loaded with an 11-bit line address to index into the PTAG array. An additional bit (DataFetch) is used to indicate which half of the PTAG array (instruction cache or data cache) to access. One half of this array is dedicated for PTAGs of primary instruction cache. Only 512 entries are used if the primary instruction cache is 16K bytes. The other half contains PTAGs of primary data cache. Each entry is 32 bits wide. The least-significant four bits are PTAG attributes: valid, parity, writable and global supplied directly from the CPU chip. Preferably, the PTAG array is implemented using high speed static RAMs. It is addressed by the primary tag address register 30 (PTAR) and the inputs/outputs are connected to primary tag data register 31 (PTDR) chips.

There are two main registers in the primary tag data register (PTDR) 31: PID and VPN. The 8-bit PID register is loaded with bits 31 through 24 of the "AddressBus" every time a MFCO PID operation is issued to the cache. For normal primary cache operations, the VPN register is loaded with the high-order virtual address (VPN) to be compared with the PTAG output. For PTAG write operations, the PTDR register 31 contains the new PTAG to be written. The PTDR register 31 also contains PTAG-compare logic and parity checkers.

The instruction cache address register (ICAR) 32 is a full counter. Only 14 bits are needed to address the preferred embodiment of the primary instruction cache (64K bytes). This counter is loaded every time a TFETCH is issued to the cache system. It is incremented once for every IFETCH. During an primary instruction cache linefill (ICFILL), the counter counts up once for every word it receives from the secondary cache. The basic functions that the ICAR performs are: nop, load, and increment.

In the cache system, the primary instruction cache array has 16,384 entries. Each entry is 36 bits wide and contains one instruction (32-bit instruction word plus four parity bits). The address register for this array is ICAR 32. Its input is connected to the "DataBus" and the output drives "IcacheBus" which is connected to the CPU and FPC chip. The primary instruction cache array is implemented using high speed static RAMs.

The data cache address register (DCAR) 32 is a 12-bit address register implemented as a modulo-2 counter because the primary data cache line is two words long. This counter is loaded every time a LOAD or a STORE is issued to the cache system. For double-word operations, it is incremented once to point to the second data word. During a primary data cache linefill (DCFILL), the counter counts once for each word it receives from the secondary cache. The basic functions that the DCAR performs are: nop, load and increment modulo-2.

For every secondary cache operation, the secondary tag address register is loaded with an 11-bit line address to index into the STAG array. An additional bit (set0/set1) is used to indicate which half of the STAG array to access.

There are two main registers in the secondary tag data register (STDR) 37: PID and VPN. The 8-bit PID register is loaded with bit 31 through 24 of the "AddressBus" every time a MPCO PID operation is issued to the cache. For normal secondary cache operations, the VPN register is loaded with the high-order virtual address to be compared with STAG output. For STAG write operations, the STDR register contains the new STAG to be written. The STDR register also contains STAG-compare logic and parity checkers.

The secondary cache address registers (SCARs) 34, 35 are 16-bit address registers for secondary cache arrays. The SCARs are loaded every time the secondary cache is accessed. The least significant bit of each SCAR is controlled separately to allow ping-pong accesses that result in one word per machine cycle. The next four bits (bits 4 through 1) form a counter to facilitate cache multi-word operations (linefills, moveout, . . . ). The upper 11 bits contain the secondary cache line address. There is also a staging register in each SCAR to enable STORE operations to overlap.

The secondary cache data register SCDR 18 is designed to have two input registers (named SCWRA and SCWRB) that receive data either form the main "DataBus" or the "BcBus." The two registers allow STORE operations to be pipelined every other cycle. They also allow streamlining multi-word write operations into the secondary cache. For example, the STORE double-word operation or SCFILL. Finally, the registers provide an indirect path for the cache controller to control memory operations.

The SCDR 18 has only one output register, called the secondary cache read register (SCRR). The SCRR receives data from either the primary data cache output, the secondary cache outputs, or the "BcBus." It drives the "DataBus" during primary cache linefills or when "LOADdata" is sent to the CPU. It also drives the "DataBus" in the cycle where noncacheable data or instruction is being passed to CPU.

During MOVEOUT sequence when a dirty secondary cache line is being written back to main memory, the SCRR drives the "BcBus." It also drives the "BcBus" in the cycle where the cache controller sends addresses or noncacheable data to the bus controller.

Cache Operations

Different cache operations are issued to the cache system by the instruction unit based on several factors: instruction unit conditions, instruction being decoded, and cache subsystem status. LCACHE, SCACHE, FLUSH and INVALIDATE instructions are discussed below.

The table below lists cache operations and their respective targets:

| CACHE OPERATION CODE TABLE | | | |
|---|---|---|---|
| | Targets | | |
| Operations | I-Cache | D-Cache | S-Cache |
| NOP | | | |
| TFETCH | yes | | if avail. |
| load word | | yes | if avail. |
| LCACHE | | | yes |
| load double-word | | yes | if avail. |
| store word | | yes | yes |
| SCACHE | | | yes |
| store double-word | | yes | yes |
| store partial-word | | | yes |
| physical FLUSH | | | yes |
| INVALIDATE virtual tag | yes | yes | yes |
| ITAG | yes | | |

The last two instructions each complete in one cycle and thus are not pipelined in the cache system.

Instruction Fetch

The fetching of the next sequential instruction, called IFETCH, normally happens every cycle in the background. As the current instruction is decoded in the A stage of the CPU pipeline, the next instruction is being fetched from the primary instruction cache. If a different primary instruction cache line is to be fetched, the CPU must issue a target FETCH (TFETCH) operation to the cache subsystem. One function of TFETCH is to fetch the first word of the new instruction stream. Another is to set up the normal sequential instruction fetch (IFETCH) mechanism and to restart it so that background prefetching can begin. The CPU will issue a TFETCH operation in case of primary instruction cache line-crossing, branch/jump instructions, exceptions, and restart.

LOAD

Figure 6:
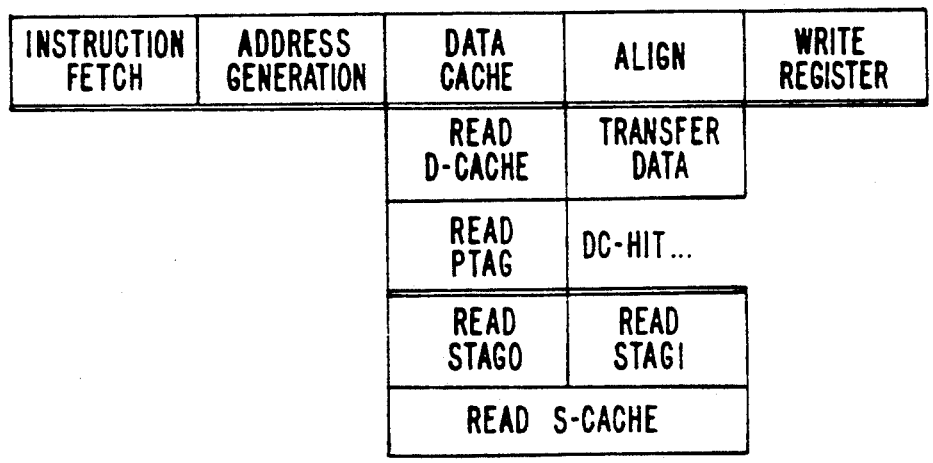
FIG. 6 is a diagram illustrating the timing model of a load word, operation.

LOAD operations are initiated to the cache subsystem to fetch different operands for different types of instructions. Load operations include load word, load double-word, load special. The load word operation and load double-word operation are not required to access the secondary cache in parallel with accessing the primary data cache. But if the secondary cache is available, it will be accessed in parallel. The operand is fetched from the primary data cache in cycle P in parallel with the primary tag (PTAG) access. If a primary cache hit occurs in the primary result PR cycle, the CPU will capture the load-data from the databus and the load word operation is completed. For load double-word operation, the second word read in the primary result PR cycle will be delivered in the secondary result SR cycle. Any associated secondary cache access started in parallel is cancelled. The timing model of the load word operation is shown in FIG. 6. As shown, the load-word instruction reads data in cycle 3 and the hit/miss signal is ready at the beginning of cycle 4.

The load special operation is generated by the LCACHE instruction. It bypasses the TLB-slice and provides the necessary physical index to access any part of the secondary cache, and in particular, the reserved area in the secondary cache where TLBs and physical TAGs are maintained. The operation also bypasses the primary data cache and always loads its operand from the secondary cache. Bit 0 of the instruction indicates which secondary cache set to access.

Figure 7:
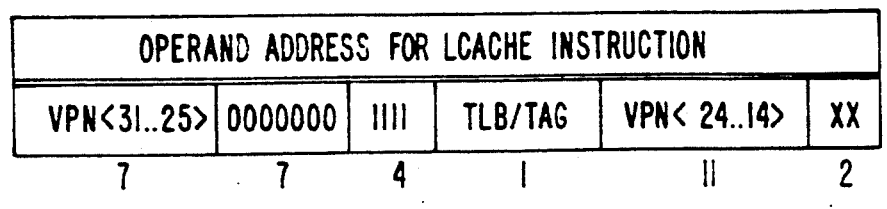
FIG. 7 is a diagram illustrating the operand address for LCACHE instructions.

To load the corresponding TLB entry of a virtual page number VPN<31...14>, the LCACHE instruction must generate an effective address of the format shown in FIG. 7. As shown there, each of bits 24 through 18 must be zero and each of bits 17 through 14 must be set to ones to point to the reserved area. Bit 13 indicates which half (0 for TLB, 1 for physical TAG) of the reserved area from which to read.

Bits 31 through 14 are used as the secondary tag (STAG) for the TLB line. Bits 17 through 2 are used as an index to each 256K byte secondary cache set. Bits 26 through 25 permit extending the index to allow expansion of the secondary cache to 2 megabytes. Though the LCACHE instruction is designed to implement an in-cache TLB, and to allow software to read/write physical tags, it can also be used to diagnose the secondary cache data arrays. In this case, bits 17 through 2 provide the word address to the secondary cache. As will be described below, the SCACHE instruction also provides similar benefits.

STORE

STORE operations are issued to the cache subsystem to store different operands for different types of instructions. Store operations include store word, store double-word, store special, and store partial (byte, half-word, word-left and word-right). Store operations are issued to both the primary data cache and the secondary cache simultaneously. If one of the caches is busy, the instruction will be held up in the A stage of the CPU pipeline. For store word and store double-word operations, store data must be written into both the primary data cache and the secondary cache. Word store-data is written into the primary data cache in cycle P in parallel with the primary tag (PTAG) access regardless of the PTAG match information.

Figure 8:
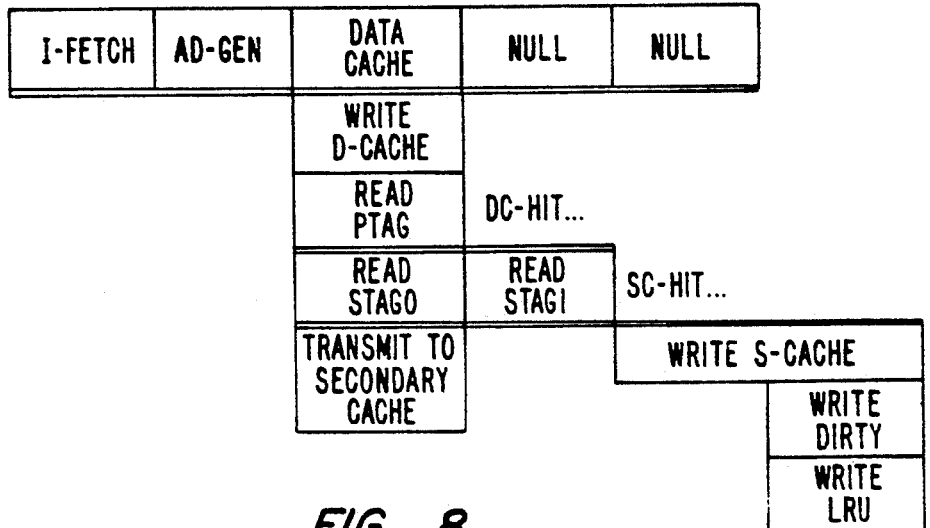
FIG. 8 is a diagram illustrating the timing model of the store word instruction with a primary cache hit.

The store data is written into the secondary cache in the secondary result SR and SR+1 cycles. The word-dirty bit and the line-dirty bit are both set in SR+1 cycle, except for store special. The timing model of the store word instruction is shown in FIG. 8.

Figure 9:
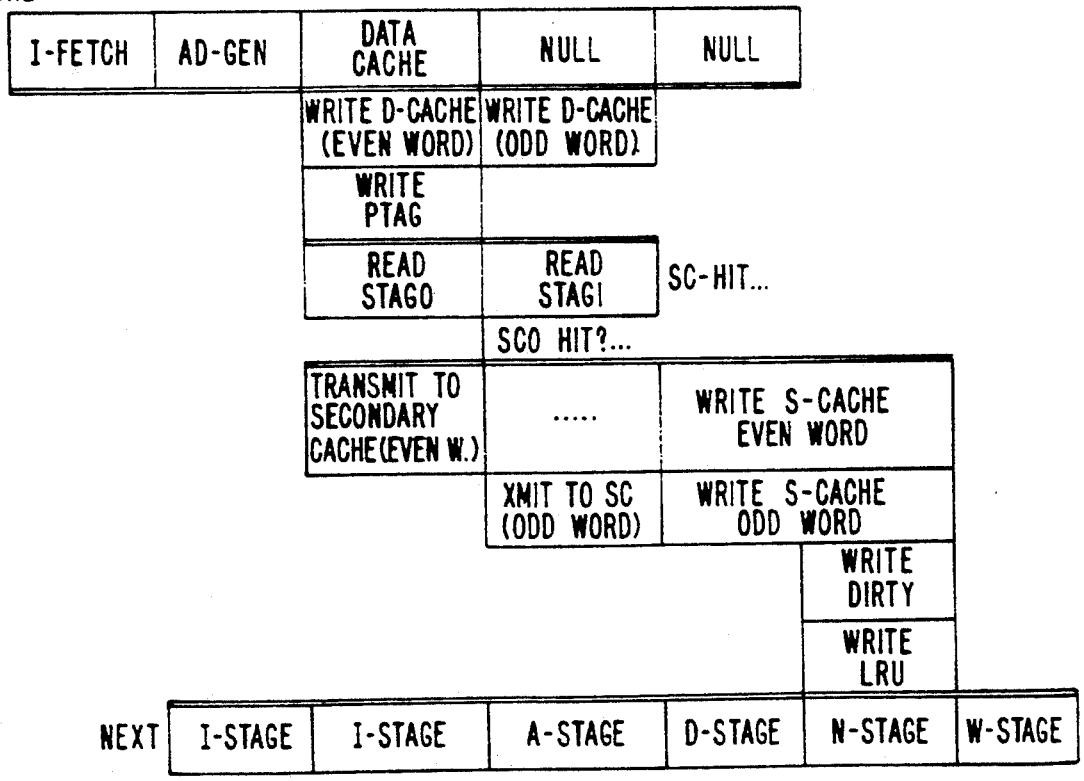
FIG. 9 is a timing model of the store double word instruction.

For store double-word operations, the first word is written into the primary data cache in the primary cycle P, and the second one in the primary result cycle PR. The primary data cache line is completely overwritten with the new data, eliminating the need for data cache refill DCFILL from the secondary cache. In this case, the PTAG does not have to be checked. Instead, the PTAG check cycle P is used to write the new PTAG. If a secondary cache hit occurs, the two words are simultaneously written into different banks of the secondary cache in the SR and SR+1 cycles. The timing model of store double-word instruction is shown in FIG. 9 illustrating a hit in the secondary cache in cycle 5.

A store partial-word operation can be generated by any of the following instructions: store byte, store half-word, store word-left, store word-right. These instructions modify a part of the data word in memory. In the preferred embodiment, store partial-word operations completely bypass the primary data cache. The PTAG check cycle P is used to invalidate the corresponding PTAG entry. The primary hit-miss status is ignored. The word in the secondary cache (or in main memory in the noncacheable case) is then partially modified using StoreMasks.

The store special operation is generated by the SCACHE instruction. It bypasses the TLB-slice and provides the necessary physical index to write into any part of the secondary cache, and in particular, into the reserved area in the secondary cache where TLBs and physical TAGs are maintained. The operation always bypasses the primary data cache and stores its operand into the secondary cache, regardless of hit-miss status. Bit 0 of the instruction indicates which secondary cache set to access. Store special also writes the corresponding secondary TAG (STAG) entry in P cycle. Bit 1 of the instruction indicates if STAG should be marked global.

To store the corresponding TLB entry of VPN<31 . . . 14> into the TLB, the SCACHE instruction must generate the effective address shown in FIG. 10. For the address in FIG. 10, bits 24 through 18 are zero. Bits 17 through 14 are ones to point to the reserved area. As above, bit 13 indicates which half (0 for TLB, 1 for physical TAG) of the "reserved" area into which to store.

Bits 31 through 14 are used as STAG for the TLB line. Bits 17 through 2 are used as index to each 256K byte secondary cache set. Bits 26 through 25 permit extending the index if the secondary cache is expanded to 2 megabytes. Store special always clears the line-dirty bit of the corresponding secondary cache line.

Even though SCACHE and LCACHE instructions are designed to implement in-cache TLB, SCACHE can also be used to initialize and diagnose the secondary cache (STAG array and SC0 and SC1 data arrays). In this case, bits 17 through 2 provide the index to secondary cache.

INVALIDATE Virtual Tag

Invalidating a line of a particular cache means marking its virtual tag invalid. We provide an instruction called invalidate virtual tag so that invalidating can be controlled by software. The invalidate instruction invalidates one line in one of the primary caches and one line in the secondary cache simultaneously. Invalidating caches thus becomes executing a series of invalidate instructions. The cache state machine is not needed to do this operation.

Like the SCACHE and LCACHE instructions, the INVALIDATE instruction always bypasses the TLB-slice mechanism. Bit 0 of the instruction indicates which of the two primary caches (0 for primary instruction cache, 1 for primary data cache) and which set of the secondary cache (0 for set0, 1 for set1) to invalidate. The invalidate instruction leaves good parity in both the PTAG and STAG.

The target address generated in the A cycle provides the required indexes to both levels of the cache subsystem. Bits 15 through 5 specify the primary instruction cache line while bits 13 through 3 specify the primary data cache line. For secondary cache, bits 17 through 7 are the line address. The addressed virtual tags are marked "invalid" in the next cycle (D). Parity is maintained in the modified entry. For a 2-megabyte secondary cache, bits 26 and 25 are used as extended address bits to access the secondary cache.

FLUSH

Only the secondary cache, because of its write-back policy, requires flushing. Flushing a secondary cache line involves checking its dirty status and writing it back to main memory if it is marked dirty. We provide an instruction called FLUSH so that flushing can be controlled by software. A FLUSH instruction is defined only if its target address points to cacheable unmapped space (the K0 segment). In this case, the TLB-slice mechanism is bypassed and the target address provides the needed physical index to access the secondary cache. Bit 0 of the instruction indicates which secondary cache set to flush.

Like load and store operations, an unmapped (or physical) FLUSH instruction that points to the reserved area must be remapped to a different area in the secondary cache. The dirty bit of the designated set is then examined, ignoring secondary cache hit/miss status. As described above, for a 2-megabyte secondary cache, bits 26 through 25 are used as extended address bits to access the secondary cache.

Special Cases—State Diagram

Figure 11:
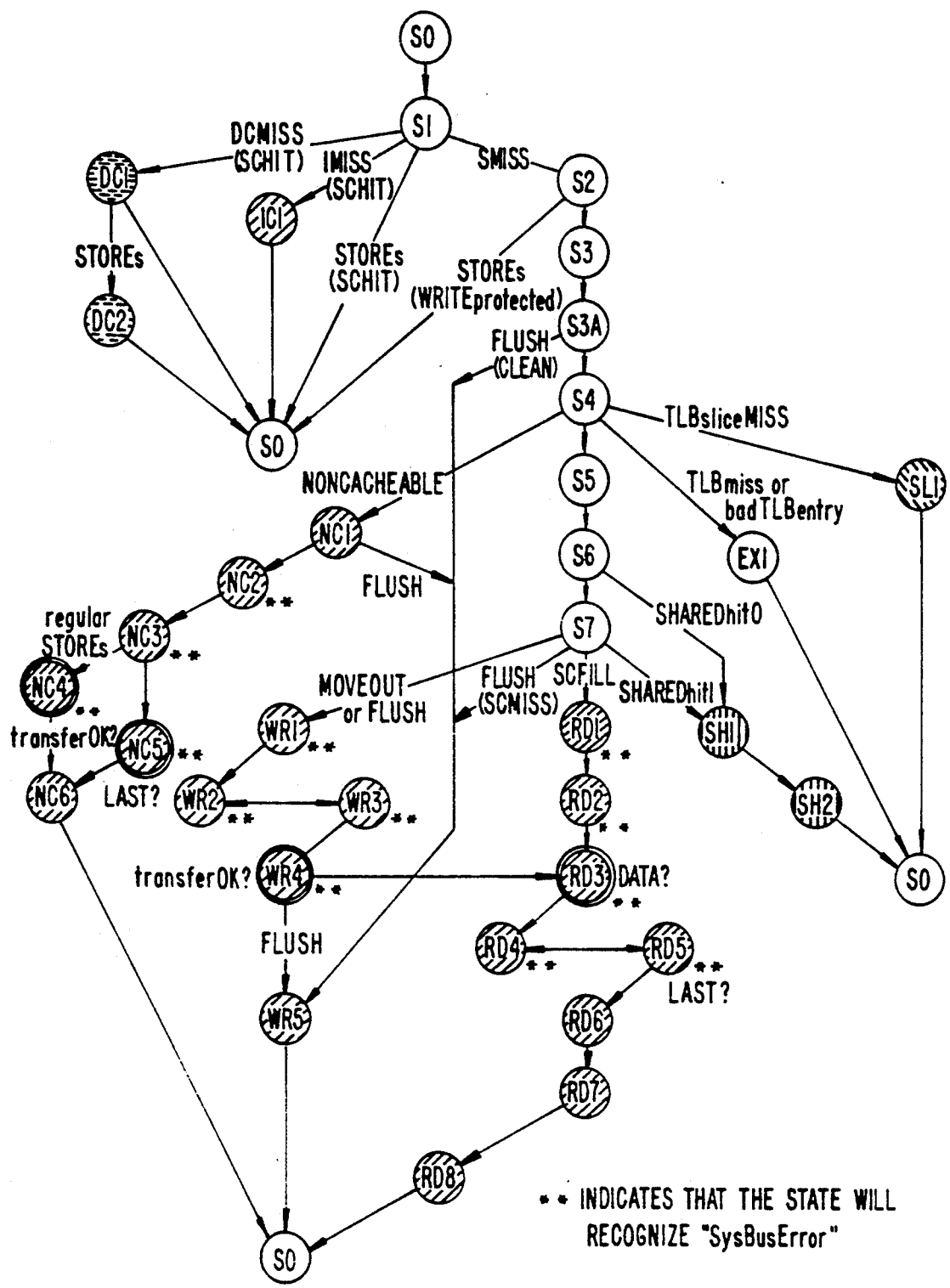
FIG. 11 is a cache state diagram.

FIG. 11 is the cache state diagram. Secondary cache accesses normally use the TLB slice mechanism to obtain the additional physical address bits required. If the effective address points to unmapped space (K0 and K1), the TLB slice structure is bypassed, and bits 17 through 14 of the effective address are used ones, then bit 17 is forced to 0. (The LCACHE and SCACHE instructions, however, do not change bit 17.) This avoids mapping operands into the reserved area where TLBs and secondary cache physical tags are kept.

If the TLB entry indicates the page is noncacheable or if the address points to K1 memory space, a word access request is made to the bus instead of a line access request. These conditions will be detected during a secondary cache miss procedure. The noncacheable operand, when it arrives, is sent to the CPU chip, and the caches are left unmodified.

For noncacheable instruction fetch, the noncacheable instruction is first written into primary instruction cache line 0, then read back out and sent to the CPU. The hardware invalidates line 0 of the primary instruction cache immediately to reflect the destruction of line 0.

In the case where a TFETCH operation accesses both primary instruction cache and secondary cache in parallel, if a primary instruction cache miss (PMISS) occurs in the primary request PR cycle, the cache state machine will be activated at the next clock. In this first state S1, the secondary cache access status is checked.

If a secondary cache hit occurs in the secondary result cycle, ICFILL sequence begins and the new valid PTAG is written into the PTAG array. State ICI will be metered at the following clock.

The primary instruction cache line is immediately filled from the secondary cache starting with word 0 of the requested line. It takes eight cycles to complete this operation. During this sequence, both the primary instruction cache and the secondary cache are busy, preventing subsequent cache accesses to be processed. FIG. 12 is a timing diagram illustrating ICFILL. After an ICFILL, the CPU must issue a TFETCH to refetch the instruction stream. If a secondary cache miss condition is detected in the secondary result cycle instead, the primary cache linefill is terminated and the corresponding primary TAG entry will be marked "invalid" in the next cycle (S2). The cache state machine then begins its secondary miss (SMISS) sequence.

In the case where a normal LOAD/STORE operation accesses both primary data cache and secondary cache in parallel, if a primary data cache miss occurs in the primary result cycle, the cache state machine will be activated at the next clock. In this first state (S1), the secondary cache access status is checked.

If a secondary cache hit occurs in the secondary result cycle, the DCFILL sequence begins and the new valid PTAG is written into the PTAG array. State DC1 will be entered at the following clock.

The primary data cache line is immediately filled from the secondary cache starting with the requested word. During this short sequence, both the primary data cache and the secondary cache are busy, preventing subsequent LOAD/STORE accesses to be processed.

The DCFILL sequence for LOAD operations is slightly different than that of a STORE operation. FIG. 13 shows both cases. There is a signal associated with the "DataBus" called "LOADdata." For LOAD operations, the cache controller asserts this signal every time the secondary cache sends a data word to the CPU.

During a DCFILL sequence for a LOAD operation, the secondary cache sends the requested data via "DataBus" to both the primary data cache and the CPU. This enables the CPU to receive the load data without refetching it from the primary data cache.

FIG. 14 is the timing diagram for a store miss circumstance in the primary data cache. Note that the other word required to fill the primary data cache line is not delivered until cycle 7. This is because STOREs are pipelined to work best with cache hits (higher frequency case) but prevent parallel operand accesses while the STAGs are being checked. While the store-data is being written into one bank of the secondary cache, the other word is read from the other bank.

If instead a secondary cache miss condition is detected in the SR cycle, the primary cache linefill is terminated and the corresponding PTAG entry will be marked "invalid" in the next cycle (S2). The cache state machine then begins the secondary miss (SMISS) sequence.

An access that misses the secondary cache will initiate the SMISS sequence to determine the cause of failure and then to fix the problem. This sequence normally causes the failing operation to be reexecuted, except for noncacheable case in which the operation will be completed. In the unusual cases (TLBmiss, badTLBentry, double-word non-cacheable access), the cache controller will post the appropriate exception to the CPU and force a software trap. The cache controller is then reset.

A STORE operation referencing a resident, but non-writable secondary cache line will also force a secondary miss (SMISS) condition in the write (W) cycle. A write protection access violation will be reported to the CPU in the next cycle when the corresponding primary data cache line is invalidated to nullify the STORE operation. The trap to exception handler will be taken a cycle later.

An SMISS condition, if not forced by a write protection access violation, causes the CPU pipeline to stall. The cache state machine will begin the SMISS sequence to resolve the situation.

The SMISS sequence begins by referencing an entry in the TLB during the "S3" and "S3A" cycles. For "unmapped" accesses, TLB mechanism is bypassed and the TLB entry returned from the secondary cache is ignored. TLB miss condition is suppressed. The operand address, which is maintained in "SR" stage of the cache pipeline, is used in place of the TLB entry.

During the latter half of the "S4" cycle, after the TLB entry has been sent to the CPU, the cache controller will determine whether fetching the physical cache TAGs of set 0 and set 1 from the bottom half of the "reserved" area is necessary. The possible occurrences are summarized below:

TLBmiss: If the TLB reference causes a cache miss in the "S4" cycle, a "TLBmiss" exception is reported to the CPU and the cache subsystem is reset. The "TLB Miss Handler" is then invoked to build a cache line of 1 to 32 valid TLB words into the TLB line. If fewer than 32 are inserted, the remainder are marked invalid. The exception handler completes and the user program resumes execution. Of course, other software solutions also can be employed.

badTLBentry: If the TLB reference causes a cache hit in the "S4" cycle, but the "valid" bit of the returned TLB entry is not set, a "badTLBentry" exception is sent to the CPU to indicate that the corresponding TLB entry has not been built. The "TLB Miss Handler" is then invoked to do the translation.

NONCACHEABLE: If the operand address points to "K1," the operand is NONCACHEABLE. If the operand is in K0, it is always cacheable. For operands in mapped space (anywhere other than K1 or K1), the TLB mechanism is used. If the TLB entry is "valid," its "NONCACHEABLE" bit is examined. NONCACHEABLE operands must be fetched from main memory by means of single word requests. The CPU will be released when the single word operation is completed. The cache state machine is then reset and the caches are left unmodified. If there is a subsequent cache operation in the cache pipeline, the CPU must reexecute it.

Double-word non-cacheable access: Only single word operations are allowed in access NONCACHEABLE pages. Double-word operations referencing uncached pages will cause a "DOUBLEinNC" exception.

TLBsliceMISS: For "unmapped" accesses, the TLB mechanism is bypassed and "TLBsliceMISS" is not possible. In mapped space, the TLB entry fetched during states "S3" and "S3A" is used to determine if a "TLBsliceMISS" occurs. The low order bits of the physical page number (PPN) from the TLB entry are compared to the output of the TLB-slice: A mismatch indicates "TLBsliceMISS." The TLB-slice is updated with the low order bits of the PPN in following cycle (SL1). The failing operation is then reexecuted.

Shared hit: If none of the above situations happens, the physical TAG of set 0 is compared with the TLB entry (or operand address in "unmapped" cases) in state "S6." A match indicates a "shared hit in set 0," the secondary tag of set 0 (STAG0) will be updated with the new virtual tag (VPN) during state "SH2." Otherwise, the last step is repeated for physical TAG of set 1 in state "S7." Once the appropriate STAG is updated, the operation can be reexecuted.

Secondary cache miss: If there is no shared hit, a secondary cache miss has occurred and the cache controller will initiate an SCFILL sequence at the next clock. The replacement algorithm employed is LRU. If the line being replaced is marked "dirty," a "MOVEOUT" sequence will be initiated to write the "dirty" secondary cache line back to main memory. "MOVEOUT" sequence is overlapped with the front end of SCFILL sequence. When the sequence ends, the cache controller is reset and the failing operation is reexecuted.

During the early part of the a secondary cache miss sequence, the cache controller initiates a read request and sends the physical address of the secondary cache line being examined to the CPU board's bus controller (SBC) chip. Since the interface to the bus controller is only 32 bits wide, the 36-bit physical address must be sent in two cycles. The 14-bit byte index is sent first (right-justified), followed by the 22-bit PPN (left-justified). If the "SystemBus" is not busy, the request is passed on to main memory (via main memory's SBC chip). The "line dirty" bit of the least-recently-used secondary cache line is then examined. If the "dirty" bit is not set, the cache controller will wait for the read data to begin filling the secondary cache. Several cycles later, main memory begins to deliver data, starting with the first word of the secondary cache line.

During the SCFILL sequence, the corresponding "line dirty" bit is cleared and the LRU bit is flipped to reflect the new status of the line. The secondary tag (STAG) entry is validated during the cycle the last data word is being written (RD6) into the secondary cache array. This is done last so that if a bus error is detected during the SCFILL sequence then the secondary cache line will not be validated. Finally, the physical TAG is written in RD7 and RD8 cycles with the PPN. In the present embodiment, the SCFILL sequence takes about 65 cycles to complete, counting from when the read request is initiated.

If an SCMISS is detected and "dirty" bit of the least-recently-used line is set then the cache controller issues a write request and begins its MOVEOUT sequence. The write address is sent to bus controller in the next two cycles then the modified data are sent in the following 32 cycles starting with the first word of the "dirty" secondary cache line.

If the "SystemBus" is busy, the write request, address and data are queued in one of the two queues on the CPU's bus controller chip. Otherwise, all information is sent through to the main memory's bus controller chip, and the CPU is notified if an error occurs. Once the returned status indicates that the operation is successful, the corresponding "dirty" bit is cleared and the cache controller resumes its SCFILL sequence.

During the MOVEOUT, read data from memory are being queued in the other queue of the memory's bus controller chip. After the last word of the "dirty" line arrives at the memory's bus controller chip, the read data are transferred to the secondary cache to complete the linefill. The CPU's bus controller chip notifies the CPU of any errors.

Writing dirty data into memory overlaps with the linefill sequence. Swapping a line takes about 80 cycles. The CPU resumes execution when the SCFILL sequence is completed.

The MOVEOUT sequence is also used to do flushing. In this case, the cache state machine is reset when the MOVEOUT operation is completed.

Cache Pipeline Controls

If an operation causes a primary cache miss (PMISS) and the secondary cache was not accessed in parallel, the operation must be retried when the primary cache and the secondary cache are available for accesses. If there is another cache operation following right behind the failing operation, it will be marked "inactive." In the case where a subsequent operation started and it accesses the secondary cache, the failing operation will steal the secondary cache to retry immediately. FIG. 15 is a timing diagram illustrating a load-word instruction causing a retry.

If an operation causes a primary cache miss, the immediately-following operation is marked "inactive."

Once the failing operation begins its linefill sequence (ICFILL or DCFILL), the subsequent operation may be restarted immediately providing the required cache(s) is not busy. FIG. 16 is a timing diagram illustrating restarting of a TFETCH operation as DCFILL begins.

If a primary cache miss (PMISS) occurs in the PR stage, the hardware validates the corresponding PTAG in the next cycle assuming a secondary cache hit will occur. If this guess is wrong, the erroneously validated PTAG must be invalidated. The failing address in SR stage is sourced back onto the "AddressBus" in the next cycle to allow this invalidation. This insures data integrity in the primary caches at all times.

The cache pipeline may be stalled because of external conditions (e.g., floating point controller). It can also be stalled because of conditions that are generated internally in the cache controller.

For example, a failing TFETCH cannot be "retried" because the secondary cache is busy doing a store operation. Another example of cache resource conflicts is that a subsequent LOAD operation cannot be "restarted" until the DCFILL sequence for a failing LOAD is completed (primary data cache conflict).

The cache pipeline is flushed whenever the secondary cache miss procedure is exited. Flushing causes the cache controller and the instruction prefetch machine to be reset. For the unusual termination cases, the exception handler is invoked. For the normal cases, the unfinished operations in the cache pipeline are to be refetched and "reexecuted."

The CPU may cancel cache operations currently in the P stage and the PR stage of the cache pipeline. The operation in the SR stage is always in the middle of a sequence that cannot be terminated and therefore cannot be cancelled.

STORE operations write primary data cache in P cycle but will not start writing secondary cache until two cycles later. If the STORE is cancelled during this two-cycle window, the primary data cache line containing the new data must be invalidated to maintain consistency between the two levels of the cache subsystem.

Cache Initialization and Error Checking

The first step in initializing the cache system involves invalidating all PTAG and STAG entries (forcing good parities). This process may be done by software via the INVALIDATE instruction. The second step is to write all data entries with good parities. The primary data cache can be initialized by using store double-word instructions to write into it. The primary instruction cache can be initialized by linefill from the secondary cache.

The SCACHE instruction can be used to initialize the secondary cache (secondary TAG array and SC0 and SC1 data arrays). For the reserved area at the bottom of the secondary cache, the TLB entries must be invalidated. Physical TAG entries must be filled with the reserved value chosen by software convention to indicate that the corresponding secondary cache lines are empty.

A byte parity scheme is used throughout the system. This allows partial modification without doing read-modify-write. All arrays and interconnecting buses are designed to include byte parities. Parities are generated by the sources (CPU, floating point controller and bus controller) to be transmitted along with data. The cache system maintains and passes parity bits along with data and never modifies them. Data and instructions are parity checked as they arrive at the CPU chip.

The foregoing has been a description of the preferred embodiment of the two-level cache memory system of our invention. It should be appreciated that specific details, such as pipeline stages, timing, instructions, and the like, have been provided, as well as information regarding the hardware implementation of the two-level cache system, for the purposes of illustration and to enable a better understanding of the invention. For example, while the TLB has been described above as 4 bits wide, more or fewer bits can also be employed to expand or contract it. If the secondary cache is expanded to megabytes, two additional physical address bits are needed, thus resulting in a 6-bit TLB. For "mapped" accesses, the 6-bit TLB slice logic provides these extra bits. For "unmapped" accesses or memory management instructions where the TLB-slice is bypassed, these additional bits come from bits 26 and 25 of the effective address. Thus, the details provided above are not intended to limit the invention, whose scope is set forth in the appended claims.

We claim:

1. A cache memory system comprising:

processing means for generating a virtual address;

a primary cache memory, comprising:

primary cache tag means containing a plurality of primary virtual tags, the primary cache tag means connected to receive at least a portion of the virtual address from the processing means and supply in response a corresponding primary cache virtual tag to the processing means;

primary instruction cache means containing a plurality of instructions and a first plurality of virtual tags, the primary instructions and a first plurality of virtual tags, the primary instruction cache means connected to receive at least a portion of the virtual address from the processing means and supply in response a corresponding instruction from the plurality of instructions to the processing means; and primary data cache means containing a second plurality of primary virtual tags and a plurality of data units, the primary data cache means also connected to receive at least a portion of the virtual address from the processing means and in response to supply a corresponding data unit from the plurality of data units to the processing means;

translation means connected to receive the virtual address form the processing and translate the virtual address into a physical address; and a secondary cache memory, comprising:

secondary cache tag means containing a plurality of secondary virtual tags, the secondary cache tag means connected to receive at least a portion of the physical address from the translation means and supply in response a corresponding secondary virtual tag to the processing means; and secondary cache means containing a plurality of instructions and data units, the secondary cache means connected to receive at least a portion of the physical address from the translation means and supply in response a corresponding instruction or data unit from the plurality of instructions and data to the processing means;

wherein the primary cache memory employs a virtual addressing scheme, thereby eliminating the need for address translation to access the primary cache memory.

2. A cache memory system as in claim 1 wherein the secondary cache means further includes a reserved section for storing secondary physical tags.

3. A cache memory system as in claim 1 wherein the secondary cache memory includes a reserved portion for storing translation lookaside buffer information.

4. A computing system comprising:

a processing unit for processing data under control of instructions;

translation means coupled to the processing unit for translating a virtual address into a physical address;

primary cache tag means coupled to receive at least a portion of the virtual address from the processing unit for supplying primary cache virtual tags to the processing unit;

secondary cache tag means coupled to receive at least a portion of the physical address from the translation means for supplying secondary cache virtual tags to the processing unit;

primary instruction cache means coupled to receive at least a portion of the virtual address from the processing unit for supplying instructions to the processing unit;

primary data cache means coupled to receive at least a portion of the virtual address from the processing unit for supplying data to the processing unit; and secondary cache means coupled to receive at least a portion of the physical address from the translation means for supplying instructions and data to the processing unit;

wherein the primary cache tag means, the primary instruction cache means, and the primary data cache means are part of a primary cache memory, the primary cache memory employing a virtual addressing scheme, thereby eliminating the need for address translation to access the primary cache memory.

5. A computing system as in claim 4 wherein the secondary cache tag means also includes physical tags.

* * * * *